Nov. 18, 1969    C. VOGEL    3,478,865
APPARATUS FOR THE HARVESTING OF TOBACCO
Filed May 24, 1968    2 Sheets-Sheet 1
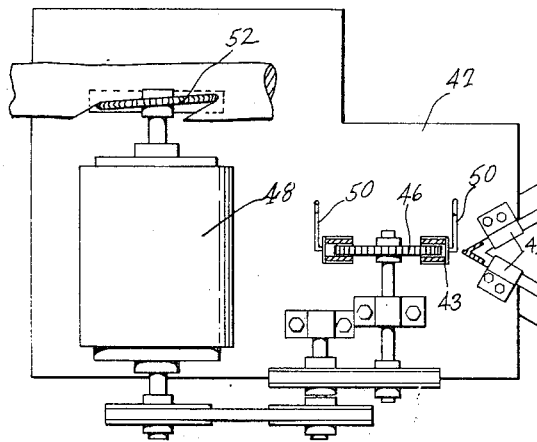
Fig.1
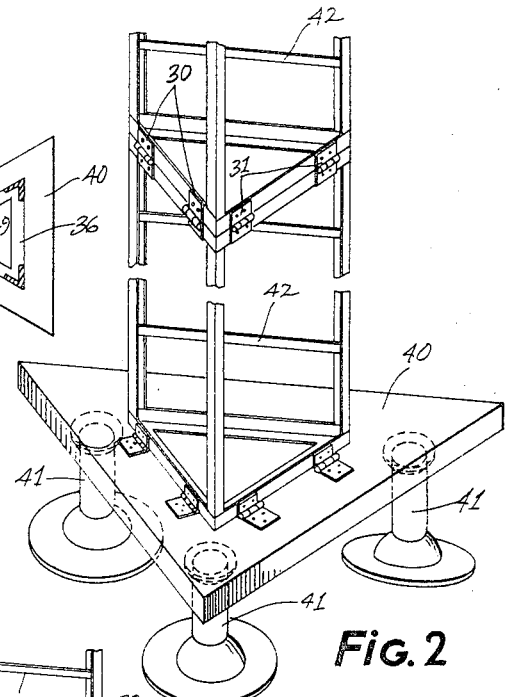
Fig.2
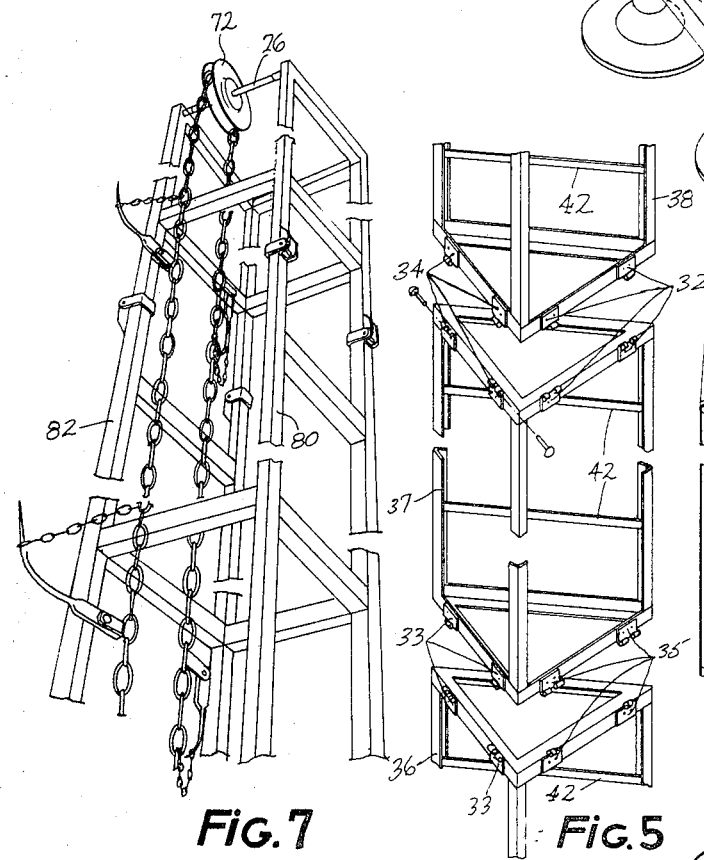
Fig.7    Fig.5    Fig.4
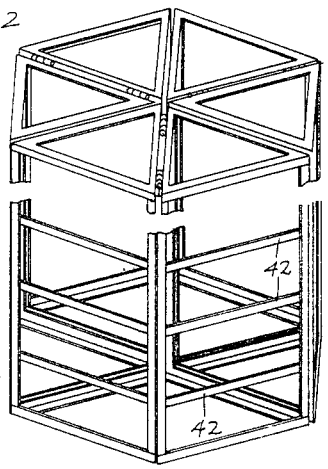
INVENTOR'S
CLIFFORD VOGEL
BY *Melville, Strasser, Foster and Hoffman*
ATTORNEYS Nov. 18, 1969     C. VOGEL     3,478,865

APPARATUS FOR THE HARVESTING OF TOBACCO

Filed May 24, 1968     2 Sheets-Sheet 2

INVENTORS

CLIFFORD VOGEL

BY *Melville, Strasser, Foster and Hoffman*
ATTORNEYS

United States Patent Office 3,478,865
Patented Nov. 18, 1969

3,478,865
APPARATUS FOR THE HARVESTING OF TOBACCO
Clifford Vogel, 2818 Joyce Ave., Apt. C, Columbus, Ohio 43211
Continuation-in-part of application Ser. No. 458,697, May 25, 1965. This application May 24, 1968, Ser. No. 731,820
Int. Cl. B65g 21/06, 15/60
U.S. Cl. 198—204                        4 Claims

ABSTRACT OF THE DISCLOSURE

Vertical coveyor comprising a tower having a plurality of sections hingedly secured together and including a conveyor element extending the full length of said tower and having means carried by the conveyor for releasably engaging a tobacco stalk.

CROSS REFERENCE TO RELATED APPLICATION

This is a continuation-in-part of application Ser. No. 458,697 filed May 25, 1965 entitled Method and Apparatus for the Harvesting and Storing of Tobacco, now United States Letters Patent No. 3,396,520.

BACKGROUND OF THE INVENTION

The harvesting and storing of tobacco has undergone substantially no change for as long as tobacco has been harvested. It is the general practice for tobacco plants to be cut manually close to the ground and impaled upon a stick. The stick is provided with a sharp pointed metallic end which is readily removable so that it can be applied to one stick after another. The tobacco plant is impaled by means of the metallic pointed end near the cut end of the stalk and a plurality of plants are thus impaled upon a single stick. These sticks are then carried into the curing barn and are laid across supporting elements built into the barn so that the tobacco plants hang leaf down. The sticks are then arranged in the barn in a number of rows with additional tiers of sticks above the lowermost tier until the barn is filled.

This procedure is very slow and requires a great deal of labor and it is therefore the principal object of the present invention to provide a method of harvesting and storing tobacco which will elimniate a large part of the labor heretofore required and whereby a tobacco crop can be harvested and stored very much more expeditiously.

It is another object of the invention to provide for a novel way of hanging the stalks in the barn to replace the sticks and impaling procedures.

Yet another object involves the provision of a vertical conveyor for carrying the stalks to upper tiers in the barn for hanging and the provision of means whereby the vertical conveyor may be disassembled, moved, and reassembled to a different position in the barn.

SUMMARY OF THE INVENTION

The conveyor of this invention comprises a tower having a number of sections hingedly secured together so that the entire tower can be collapsed and reset up in the relatively narrow confines between the hanging racks in a tobacco barn. At least one side of the tower structure is provided with rungs to form a ladder, so that a workman can utilize the tower to climb to any location within the barn. The tower also serves as a supporting structure for a conveyor extending the full length of the tower, and including means for releasably engaging individual tobacco stalks.

DESCRIPTION OF THE DRAWING

FIGURE 1 is a plan view of the drive unit for the vertical conveyor showing the conveyor tower in cross section.

FIGURE 2 is a fragmentary perspective view of the lower end of a exemplary conveyor tower.

FIGURE 4 is a fragmentary perspective view of a conveyor tower of different configuration.

FIGURE 5 is a fragmentary perspective view showing diagrammatically how the tower of FIGURES 2 and 3 is disassembled.

FIGURE 7 is a fragmentary perspective view of the upper end of the conveyor tower of FIGURE 6.

DESCRIPTION OF THE PREFERRED EMBODIMENT

Figure 3:
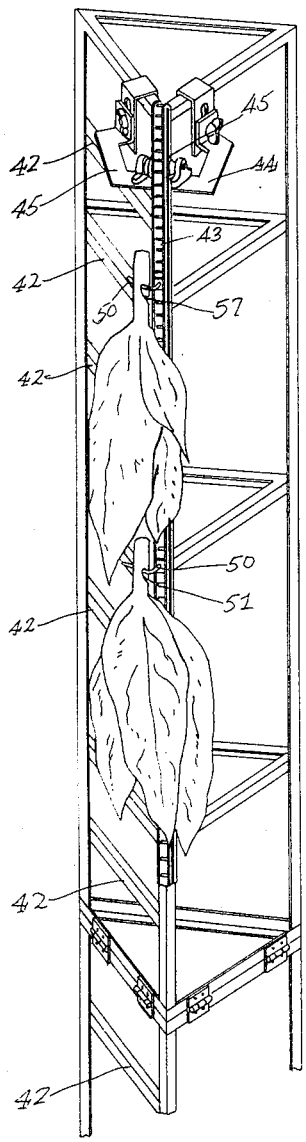
FIGURE 3 is a fragmentary perspective view of the upper end of the same conveyor tower.

As explained earlier, the harvesting of tobacco, according to general practice, contemplates that a plurality of plants are impaled on a single stick, which are then carried into the barn for curing on these sticks. U.S. Patent No. 3,396,520, of which this application is a continuation-in-part, contemplates that the stalks be cut individually by the apparatus disclosed and claimed therein, and that the stalks as cut be individually arranged on the wagon.

When the wagon is fully loaded, it is taken to the barn where the tobacco stalks are to be stored for curing. According to the present invention, the barn will be provided with rows of wires or the like on which the stalks may be hung. These rows of wires will be parallel and there will be additional tiers of wires for each of said rows extending all the way to the top of the barn. In order to convey the stalks to upper reaches of the barn and to provide means whereby they may be hung on the wires, a saw cut is made in each stalk, said cut extending inwardly into the stalk in a direction toward the cut end, thus in effect providing a hook in the stalk by means of which the stalk may be hung upon a wire. The lowermost wires in the barn may of course be filled with tobacco stalks by a laborer standing upon the ground. However, for the purpose of hanging stalks or wires in upper tires, there is provided a particular type of vertical conveyor which will be described in more detail hereinafter which may be set up between two rows of wires and may extend all the way to the top of the barn. When all the wires in two adjacent rows of tiers have been filled, the conveyor must be moved to a next row and for this purpose the conveyor may be partially disassembled, lowered to the ground, moved to another position and re-erected.

Referring now to the drawings, the vertical conveyor comprises a tower made in a number of sections which are hinged together.

The tower is of polygonal cross section and the preferred cross section is triangular as seen in FIGURES 2, 3 and 5. It may, however, have any desired cross section and a hexagonal cross section is shown in FIGURE 4 by way of example. For convenience, the individual sections may be say five or six feet long and they are composed of angle members suitably welded together to form a triangular prismatic section. Adjacent sections are hinged together on two adjacent sides of the triangle as, for example, by means of hinges 30 and 31 (FIGURE 2). The hinges are preferably of the push-pin type so that for collapsing the tower either the pins 30 or the pins 31 may be pulled and the adjacent sections then hinged about the remaining hinges 31 or 30, as the case may be.

In FIGURE 5, there are indicated diagrammatically three adjacent sections of a tower. When it is desired to collapse the tower to move it from one position between two rows of tiers of wires to another position, a rope may be secured to the upper end of the tower and passed over a joist and held by a workman at the top of the barn. Assuming then that the section generally indicated at 36 in FIGURE 5 was the lowermost section standing upon the ground, the pins of the hinge pairs 35 would be pulled, the tower raised slightly, and the sections 36 then swung about the hinge pairs 33. The tower would then be lowered toward the ground until the section 36 rests on the ground. Then the pins of the hinge pairs 34 could be pulled, the tower raised slightly while the tower sections 36 and 37 as a unit are hinged about the hinge pairs 32 and then the tower lowered toward the ground so that section 37 rests on section 36. This procedure would be carried on for as many sections as constitute the tower.

Because of the fact that the ground in the barn may be more or less level, the tower is preferably mounted as seen in FIGURE 2 upon a platform 40 which may be provided with feet 41 having conventional leveling screws or the like. In some cases, the tower will be tilted at an angle and rest against a joist or the like of the barn. The tower is provided on one side at least with rung members 42 which serve as a ladder for a workman to climb up to the top of the barn. The vertical conveyor itself may be a sprocket chain or the like 43 which at its upper end passes over a sprocket wheel 44 mounted upon brackets 45 secured to the top of the uppermost section of the tower. The lower end of the sprocket chain 43 passes around a sprocket 46 mounted upon a platform 47. The sprocket wheel 46 is driven by means of suitable belts or gears from a motor or the like at 48. The platform 47 may, if desired, be arranged to stand upon the ground or it may be arranged to be hooked at any desired level onto the tower by means of hook brackets 49 (FIGURE 1). The tension in the chain 43 will be sufficient to support the platform 47 in the event that it is hooked on as shown in FIGURE 1.

The chain carries a series of fingers 50 on which the cut stalks are hung to be transported to upper tiers of wires and, as best seen in FIGURE 3, the fingers 50 support a stalk of tobacco by passing into a slot 51 cut into the tobacco stalk. This may be accomplished as best seen in FIGURE 1 by means of a saw element 52 mounted on the shaft of the motor 48. The saw blade 52 may be mounted normally on the shaft and the stalk presented to the blade at an angle or in order to make a larger slot the saw blade may be mounted for wobble action as shown in FIGURE 1.

In practice, the tower for the conveyor is set up between rows of tiers of wires in the barn. The stalks are notched or slotted in FIGURE 1 and are then hung on the fingers 50 of the conveyor chain 43. As they reach the desired level, a workman at that level removes the stalks from the conveyor and hangs them on the adjacent wire. When the wire is filled, the workman may climb up the ladder constituted by the rungs 42 to the next tier and continue the operation. When all the tiers in a row have been filled, the tower may be lowered as described above and moved to the next row and re-erected and the storing operation continued.

Figure 6:
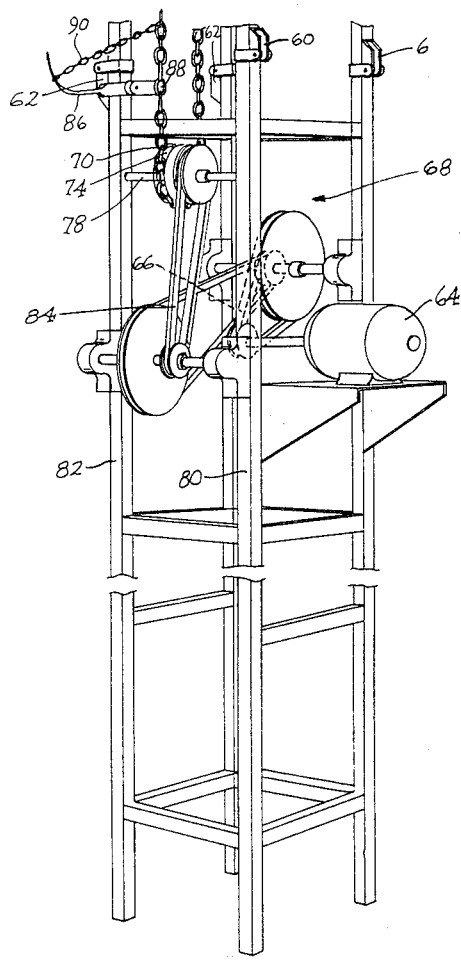
FIGURE 6 is a fragmentary perspective view of the lower end of a tower of a different configuration carrying the drive unit.

In FIGURES 6 and 7, a further embodiment of the invention has been illustrated. According to this embodiment, the tower sections are rectangular in cross section, and are hinged together on opposite sides by the hinges 60 and 62. In accordance with the foregoing disclosure, these hinges are preferably of the push-pin type, so that for collapsing the tower in accordance with the earlier description, either the pins from the hinges 60 or the pins from the hinges 62 may be pulled so that the adjacent sections of the tower may be hinged about the remaining hinges 60 or 62 as the case may be.

In this embodiment of the invention, it will be seen that the drive for the vertical conveyor itself is carried by the tower. The drive includes the motor 64 which will be connected to a suitable source of electric power. The motor by means of the belt 66 drives the drive train indicated generally at 68. The particular drive train does not form a part of this invention per se, and need not be described in detail. It is sufficient for purposes of this invention that the drive ratio be selected in view of the motor speed in order to provide the proper speed for the conveyor element 70.

As seen in the figures, the conveyor element 70 is an endless sprocket chain or the like which at its upper end passes over the wheel 72 and at its lower end passes around the wheel 74. The wheels 72 and 74 respectively are mounted on the shafts 76 and 78, which are journaled for rotation in a conventional manner in the vertical members 80 and 82 of the tower structure. The lower wheels 74 and shaft 78 are driven by the drive train 68 through the belt 84.

As best seen in FIGURE 6, the conveyor element 70 includes a plurality of outwardly extending fingers 86. These fingers may be hingedly secured to the conveyor element 70 as indicated at 88, and may be provided with the flexible support member 90, which serves on the upwardly moving flight of the conveyor to hold the finger in substantially the horizontal position.

Operation of this embodiment of the invention will correspond exactly to the operation of the embodiment previously described.

It will be understood that numerous modifications may be made without departing from the spirit of the invention, and no limitation is intended or should be assumed other than as set forth in the claims which follow.

The embodiments of the invention in which an exclusive property or privilege is claimed are defined as follows:

1. A vertical conveyor for use in tobacco barns and the like and adapted to stand upon the ground, and having the cross section of a polygon, and comprising a plurality of like sections arranged one on top of the other, each section being connected to the adjacent section by a first and second separable hinge connection, all said first connections being on one side of said polygon and all said second connections being on another side of said polygon whereby alternatively the first and second connections between adjacent sections may be released in sequence, and those sections below the released connection hinged about the other of said connections, and the sections above the released connection lowered toward the ground, one at a time.

2. The structure of claim 1, wherein said polygon is an equilateral triangle.

3. The structure of claim 1, wherein rungs are provided on each of said sections on the same side of said polygon, to provide a ladder.

4. The structure of claim 1, wherein the lowermost section is provided with leveling means for adjusting said conveyor, a drive unit for said conveyor, said conveyor having a continuous conveying element driven by said drive unit, there being a lower drive wheel associated with said drive unit, an upper idler wheel mounted adjacent the top of the uppermost of said sections, and said conveying element passing over said drive and idler wheels, said element having a plurality of spaced fingers upon which individual stalks of tobacco may be hung.

References Cited

UNITED STATES PATENTS

| | | | |
|---|---|---|---|
| 1,402,787 | 1/1922 | Norris | 198—139 |
| 2,157,500 | 5/1939 | Sarsfield | 52—637 |
| 2,491,899 | 12/1949 | Mercier | 52—638 |
| 3,062,340 | 11/1962 | Hunnebeck | 52—641 |
| 1,203,514 | 10/1916 | Fetrow | 198—178 |

EDWARD A. SROKA, Primary Examiner